(No Model.)

J. C. RAYMOND.
BICYCLE.

No. 567,042.  Patented Sept. 1, 1896.

WITNESSES:
Jos. A. Ryan
P. B. Turpin

INVENTOR
John C. Raymond
BY Munn & Co.
ATTORNEYS.

UNITED STATES PATENT OFFICE.

JOHN C. RAYMOND, OF NEW YORK, N. Y.

BICYCLE.

SPECIFICATION forming part of Letters Patent No. 567,042, dated September 1, 1896.

Application filed May 16, 1896. Serial No. 591,857. (No model.)

*To all whom it may concern:*

Be it known that I, JOHN C. RAYMOND, residing in New York, in the county of New York and State of New York, have invented a new and useful Improvement in Bicycles, of which the following is a specification.

This invention is an improvement in bicycles and is designed to utilize the strength of both arms and legs and so secure a uniform development of the muscular system and to secure a more natural position of the body in working the machine, avoiding the awkward and cramped position common to the use of the ordinary bicycle; and the invention consists in certain novel constructions, combinations, and arrangements of parts, as will be hereinafter described, and pointed out in the claims.

Figure 1:
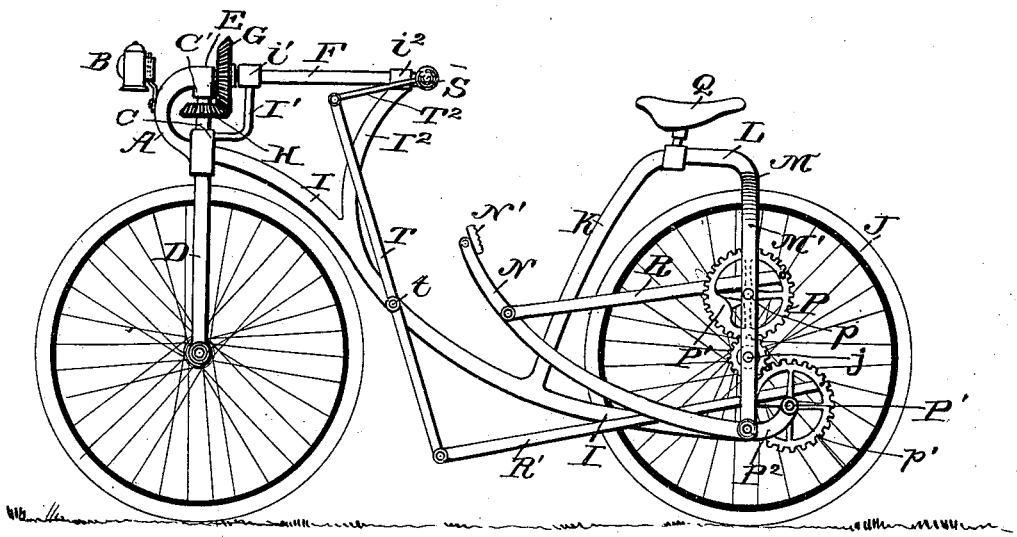
Figure 2:
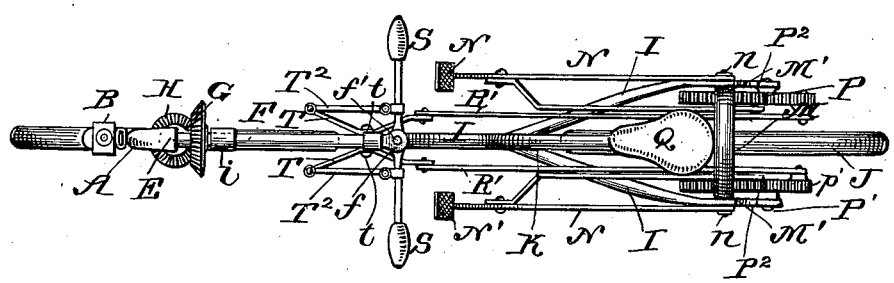

In the drawings, Fig. 1 is a side view of my improved bicycle, and Figure 2 is a top plan view thereof.

In carrying out my invention I provide a suitable framing which, in the construction shown, comprises a front portion A, adapted to support the lamp B and having vertical bearings at C and C' for the shaft of the steering-wheel fork D, and also a horizontal bearing at E for the counter-shaft F, which carries the gear G, meshed with the bevel-pinion H on the shaft of the steering-wheel fork. The drop-reach I is provided with a bracket I', which extends upward and is provided with a bearing $i'$ for the shaft F, such bearing $i'$ being immediately in rear of the bevel-wheel G, and in rear of the bracket I' I provide the reach I with an upwardly-curving bracket $I^2$, which is provided at its upper end with a bearing $i^2$, which supports the rear end of the shaft F, the brackets I' and $I^2$ serving to firmly support the said shaft F and to hold it rigidly in its desired position. A short distance in advance of the drive-wheel J, I extend from the reach an upwardly-projecting portion K, which supports or connects with the seat-bar L at the front end of the latter. At the rear end of the seat-bar L, I connect the fork M, to which the drive-wheel J is journaled at $j$, and the arms of such fork extend below the journal $j$ and connect at their lower ends with the rear ends of the reach I, the treadles N being pivoted at $n$, as best shown in Fig. 1. A pinion O is fixed on the axle of the drive-wheel J, and gears P P' are journaled at $p\ p'$ to the arms M' of the fork M. It should be understood that the gears P, P', and O are provided on each side of the drive-wheel J, and are operated by the devices which I will now describe.

The treadles N are pivoted at $n$ and extend upwardly and forwardly to a point where their pedals N' are in suitable position to be conveniently operated by a rider seated on the saddle Q. To the treadles N are connected one end of the pitmen R, the other ends of which connect with their respective gears P, which gears, like gears P', are provided at $P^2$ with counterpoise-weights, which are preferably arranged at points diametrically opposite the connection between the pitmen R R' and the gears P P', as shown in Fig. 1. As shown in Fig. 1, the treadles are arranged to be worked together, but it will be understood that they may, when desired, be so connected with their respective gears P as to operate reciprocally or alternately up and down. The handle-bar S is connected at its center with the counter-shaft F, so it may operate to turn said shaft and so effect the steering through the aid of gears G and H, and also so such handle-bar may be worked back and forth to operate the levers T, which are pivoted at $t$ to the reach I and connect at their lower ends by means of pitmen R' with the gear-wheels P'. Pitmen $T^2$ connect the upper ends of the levers T with the handle-bar S, and such handle-bar, as it is rocked back and forth, will operate the levers T and through the geared connection with the drive-wheel J will operate to propel the wheel. In connecting the handle-bar with the counter-shaft F the latter is preferably provided at its rear end with ears $f$, between which the handle-bar S fits and is pivoted at $f'$, as shown. By this construction it will be seen that if the handle-bar be rocked up and down it will operate to steer the wheel to one side or the other, while if such handle be rocked back and forth on its pivot $f'$ it will operate through the connections T, T', and P to propel the machine forward.

In operation the rider, seated upon the saddle Q, may lean back in an easy natural position and propel the treadles M with his feet and operate the handle S with his hands, and by pressing forward with his feet and drawing back with his hands can secure great power and effect a rapid propulsion of the machine.

In constructing the machine I have so designed the framing and several working parts that the same machine is adapted for use by both ladies and gentlemen, avoiding the necessity of providing different machines for the two sexes.

Having thus described my invention, what I claim, and desire to secure by Letters Patent, is—

1. A bicycle substantially as described, comprising the frame, the steering-wheel fork having the bevel-gear, the counter-shaft having a bevel-gear meshing with that of the steering-fork, the handle-bar adapted to turn the counter-shaft and having a jointed connection therewith whereby it may be rocked back and forth, the levers pivoted to the frame, pitmen connecting such levers with the handle-bar, and pitmen and gearing connecting the said levers with the drive-wheel, substantially as shown and described.

2. The combination substantially as described, of the framing, the steering-wheel fork having a bevel-gear, the counter-shaft journaled to the framing and having a bevel-gear meshing with that of said fork, the handle-bar jointed to said counter-shaft whereby it may be rocked up and down to turn said shaft or back and forth independently of said shaft, the levers, the pitmen connecting said levers with the handle-bar, the drive-wheel, connections between said levers and the drive-wheel, the treadles and connections between said treadles and the drive-wheels, all substantially as described, whereby the rider may brace against the handle-bar and treadles in operating the machine by both arms and legs substantially as set forth.

3. In a machine substantially as described, the combination of the framing having a reach and a front portion, the latter being provided with vertical bearings for the shaft of the steering-wheel fork and with a horizontal bearing for the counter-shaft, and the reach being provided with upwardly-projecting brackets having bearings for the counter-shaft in alinement with that of the front portion of the framing, the steering-wheel fork journaled in said vertical bearings and having a bevel-gear between the same the counter-shaft journaled in its said bearings and having a bevel-gear meshing with that of the steering-wheel fork the handle-bar connected with the counter-shaft and adapted to turn the same, the drive-wheel and operating connections between the drive-wheel and handle-bar substantially as shown and described.

4. In a bicycle substantially as described, the combination of the framing composed of the reach having the front portion A provided with the bearing C C' and E, the brackets I' I² having the bearing $i'$ $i^2$, and the upright portion K, the seat-bar L, and the fork M, the drive-wheel journaled to the fork M and having the gear O, the gears P P' journaled to fork M and meshing with the gears O, the steering-wheel fork journaled in the bearing C C' and having the bevel-gear between said bearings, the counter-shaft journaled in the bearings E, $i'$ $i^2$ and having the bevel-gear meshing with that of the steering-wheel fork, the handle-bar jointed to the shaft F, connections between said handle-bar and the gears P', the treadles, and connections between said treadles and the gears P, all substantially as shown and described.

JOHN C. RAYMOND.

Witnesses:
P. B. TURPIE,
SOLON C. KEMON.